United States Patent in 't Veld

[15] 3,666,108
[45] May 30, 1972

[54] SEPARATOR FOR LIQUIDS OF DIFFERENT SPECIFIC GRAVITIES

[72] Inventor: Cornelis in 't Veld, Vlaardingen, Netherlands

[22] Filed: Apr. 20, 1970

[21] Appl. No.: 30,091

[52] U.S. Cl..............................210/305, 210/522, 210/535, 210/537, 210/540
[51] Int. Cl. .....................................B01d 21/10, B01d 35/00
[58] Field of Search......................210/83, 84, 521, 522, 305, 210/313, 535, 537, 540

[56] References Cited

UNITED STATES PATENTS

| 1,543,621 | 6/1925 | Ruckstuhl | 210/522 X |
| 1,682,256 | 8/1928 | Schwarz | 210/522 X |
| 3,184,065 | 5/1965 | Bradford | 210/521 X |
| 3,375,928 | 4/1968 | Chase | 210/83 |
| 3,510,006 | 5/1970 | Cheysson | 210/522 |

Primary Examiner—John Adee
Attorney—Young & Thompson

[57] ABSTRACT

A separator for liquids of different specific gravities, such as oil and water, comprises a tank having a hopper therein with downwardly convergent side walls and an open bottom which is spaced above the bottom of the tank, the top of the hopper being closed by the top of the tank. Oil-water mixture is fed to an intermediate level of the hopper, and oil is withdrawn from the top of the tank and water from the bottom of the tank on the opposite side of a filter that passes water but not oil. The downward convergence of the hopper walls lengthens the path through which the water must travel during separation, thereby to reduce the entrainment of oil in the water. Vertical anti-turbulence baffles are positioned in the hopper, as well as a sensor responsive to the presence of oil to control the device. By-pass conduits return to the top of the hopper the oil that accumulates in the tank outside the hopper.

3 Claims, 1 Drawing Figure

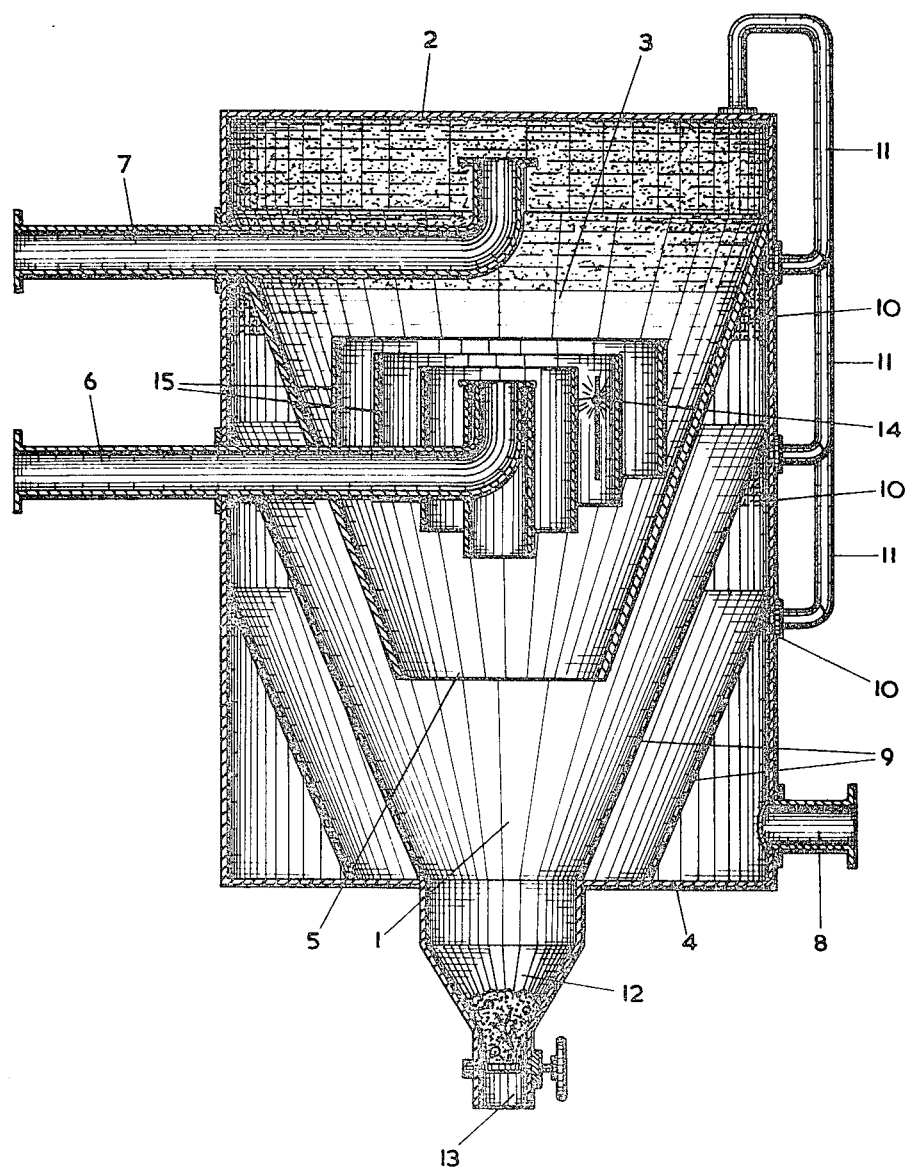

SEPARATOR FOR LIQUIDS OF DIFFERENT SPECIFIC GRAVITIES

This invention relates to liquid separators for the automatic separation of liquids of different specific gravities and more particularly to systems in which a separation of nonmiscible liquids of different specific gravities is effected.

In known separating apparatus of this type, the mixture of the two liquids of different specific gravities is brought into a tank in which under conditions without turbulence the opportunity is given for separation in which the liquid of lighter weight accumulates in the upper part of the tank. By the use of discharge pipes at suitable locations, the two separated liquids are discharged from the tank.

Since the supply of the liquid mixture by using a pump in the supply pipe will lead to a further intensification of mixing, adversely affecting the separation of said liquids in the tank, the apparatus of the invention operates with underpressure, that is to say, the discharge pressure of both separated liquids is lower than the supply pressure of the liquids. Said underpressure operation can be accomplished by a suitable location of the apparatus with respect to the source of the liquid mixture and the collecting tanks for the separated liquids or by using a suction pump in the discharge pipe of the liquid of heavier weight.

The present invention has for its object to provide a liquid separator for the separation of liquids of different specific gravities of the above-mentioned type having a great capacity, for example up to 1,000 tons/hour per unit.

Although the apparatus of the invention may be used for the separation of various mixtures of liquids of different specific gravities, the apparatus is in particular suitable for the separation of oil and water from an oil-water mixture.

Another object of the present invention is to improve the sharpness of separation of liquids of different specific gravities.

In accordance with the principles of the present invention, the above objects are obtained by providing a separating apparatus for the automatic separation of liquids of different specific gravities including a tank at least a part of the top wall of which is the upper end of a hopper-shaped hollow body the downwardly directed end of which is open and is at some distance above the tank bottom, in which the mixture supply pipe empties about half way up said hollow body, the discharge pipe for the liquid of lighter weight being connected to the upper part of said hopper-shaped hollow body and the discharge pipe for the liquid of heavier weight being connected to the tank in the region between the lower end of said hopper-shaped hollow body and the tank bottom.

In the apparatus of the invention, the separation of the liquids, for example, oil and water, takes place within the hollow body where the suction operation of the water discharge pipe does not act, so that the turbulence is kept as small as possible. The hopper shape of said hollow body has the effect that within said body where the layer of oil lies above the layer of water, the thickness of said water layer is considerably greater than in case the hollow body has a cylindrical shape. This means that oil particles having insufficient rising capacity have to follow a longer path from the oil-water separation area for leaving said hollow body through its bottom opening; thus only very small oil particles can leave the lower end of said body.

In order to prevent water from carrying with it even said small oil particles, a filter is positioned between the tank bottom and the tank wall and runs almost parallel to the adjacent part of said hopper-shaped hollow body.

With these and other objects in view, the invention consists in the construction, arrangement and combination of parts, all of which will be first fully described in connection with the accompanying drawing, which is a somewhat schematic side cross-sectional view of the apparatus according to the present invention.

As appears from the accompanying drawing, the separator according to the invention comprises a tank 1 the upper wall 2 of which is the upper end of a hopper-shaped hollow body 3 within said tank 1. The lower end of said body 3 lies at some distance above the tank bottom 4 and is open at 5. The mixture of liquids of different specific gravities, hereinafter referred to as oil and water, is supplied through a pipe 6 emptying half way up said hollow body 3. The end of pipe 6 is bent upwardly. In said hollow body 3 the separation of oil and water takes places and the oil accumulates in the upper part of said hollow body 3. The intake of a pipe 7 for the discharge of oil is located in said upper part.

As already stated, the apparatus according to the invention for the separation of liquids of different specific gravities is particularly suitable for the separation of oil and water from an oil-water mixture. Before operation, tank 1 is filled with water. Then an underpressure in the tank is generated by discharge of water, and oil-water mixture is sucked into the interior of hollow body 3. Said underpressure can be effected by a suitable location of the apparatus with respect to the source of oil-water mixture and the collecting tanks for the water and the oil so that the pressure at the supply side of tank 1 is greater than the pressure at the discharge side of tank 1, or by using a pump (not shown) in water discharge pipe 8.

During the separation within hollow body 3, oil accumulates at the upper part of said body and water accumulates in the lower part. By the use of a hopper-shaped hollow body, the thickness of the water layer is proportionally much greater than the thickness of the oil layer. The separated oil is discharged through pipe 7 and the water is discharged through pipe 8. During operation, it is possible that oil particles having insufficient rising capacity will be carried with the discharged water. In this respect it is to be noted that due to the selected shape of hollow body 3 in which the thickness of the water layer is much greater than the thickness of the oil layer, only oil particles of very small dimensions could be carried out with the water.

In order to catch even these very small oil particles, filters 9 are provided, extending upwardly from tank bottom 4 almost parallel to the adjacent wall of the hollow body 3, up to a side wall of tank 1. Each filter is made of a substance which lets pass water but does not let pass oil. Oil particles being carried with the water out of the hollow body 3 but not passing the filters 9 will rise and accumulate in spaces 10. A number of by-pass pipes 11 is connected on the one hand to said spaces 10 and on the other hand to the tank top wall 2 so that even these oil particles are supplied to the oil layer at the upper part of hollow body 3.

Sand, mud and other impurities being carried with by the oil-water mixture will sink downwardly out of hollow body 3 to a collecting reservoir or sump 12 in the tank bottom, a discharge pipe 13 being connected to said reservoir through a valve.

Sensors 14 are positioned at suitable places inside hollow body 3 for sensing the presence of oil in the water. Said sensors are connected to a conventional electric circuit (not shown) for controlling the operation of the apparatus of the invention through conventional transmission means (not shown).

In a preferred embodiment of the invention, vertical anti-turbulence baffles or sleeves 15 are disposed within hollow body 3.

Having described my invention, I claim:

1. Apparatus for the automatic separation of liquids of different specific gravities, comprising a tank, a hopper disposed in the tank, the tank having a top wall that closes the top of the hopper, the bottom of the hopper being open and spaced above the bottom of the tank, the side walls of the hopper converging downwardly, a pipe for introducing the mixture of liquids to be separated into an intermediate portion of the hopper, a pipe for removing the lighter liquid from the upper part of the hopper, a pipe for removing the heavier liquid from a lower portion of the tank below the hopper, and filter means of a material that passes said heavier liquid more readily than said lighter liquid entirely separating the lower end of the hopper from the last-named pipe for selectively passing said heavier liquid, said filter means being disposed substantially parallel to adjacent walls of the hopper and said material extending from the bottom to the side walls of the tank.

2. Apparatus as claimed in claim 1, said filter means having the form of at least one truncated cone converging downwardly.

3. Apparatus for the automatic separation of liquids of different specific gravities, comprising a tank, a hopper disposed in the tank, the tank having a top wall that closes the top of the hopper, the bottom of the hopper being open and spaced above the bottom of the tank, the side walls of the hopper converging downwardly, a pipe for introducing the mixture of liquids to be separated into an intermediate portion of the hopper, a pipe for removing the lighter liquid from the upper part of the hopper, a pipe for removing the heavier liquid from a lower portion of the tank below the hopper, filter means of a material that passes said heavier liquid more readily than said lighter liquid entirely separating the lower end of the hopper from the last-named pipe for selectively passing said heavier liquid, said filter means being disposed substantially parallel to adjacent walls of the hopper and said material extending from the bottom to the side walls of the tank, and conduit means to return to the top of the tank lighter liquid that collects between the side walls of the tank and the top of the hopper on the outer side of the hopper, said conduit means communicating only between the top of the tank and the spaces between the side walls of the tank and the outer side of the hopper.

* * * * *